United States Patent [19]

Weddigen

[11] 4,221,848
[45] Sep. 9, 1980

[54] ELECTROCHEMICAL STORAGE CELL OR BATTERY OF THE ALKALI METAL AND SULFUR TYPE

[75] Inventor: Gert Weddigen, Heidelberg-Neuenheim, Fed. Rep. of Germany

[73] Assignee: Brown, Boveri & Cie AG, Mannheim-Kägertal, Fed. Rep. of Germany

[21] Appl. No.: 853,842

[22] Filed: Nov. 22, 1977

[30] Foreign Application Priority Data

Nov. 27, 1976 [DE] Fed. Rep. of Germany ....... 2653966

[51] Int. Cl.$^2$ .............................................. H01M 6/18
[52] U.S. Cl. ..................................... 429/104; 429/105
[58] Field of Search ............... 429/104, 101, 102, 218, 429/191, 193, 105

[56] References Cited

U.S. PATENT DOCUMENTS

| 4,002,806 | 1/1977 | Gupta et al. | 429/104 |
| 4,002,807 | 1/1977 | Ludwig | 429/104 |

Primary Examiner—Anthony Skapars
Attorney, Agent, or Firm—Herbert L. Lerner

[57] ABSTRACT

An electrochemical storage cell or battery with at least one anode filled with a molten alkali metal as the anolyte and at least one cathode chamber filled with a sulfur-containing catholyte substance with the anode chamber and the cathode chamber separated from each other by an alkali-ion-conducting solid electrolyte. To the catholyte substance in the cathode chamber is added a chemical compound of the polar bond type which can charge the sulfur positively while absorbing electrons. This induces mobilization of the sulfur phase in the cathode chamber and prevents major accumulation of liquid sulfur as an insulator. As a result the cell can be repeatedly recharged with large currents to a greater capacity.

1 Claim, 1 Drawing Figure

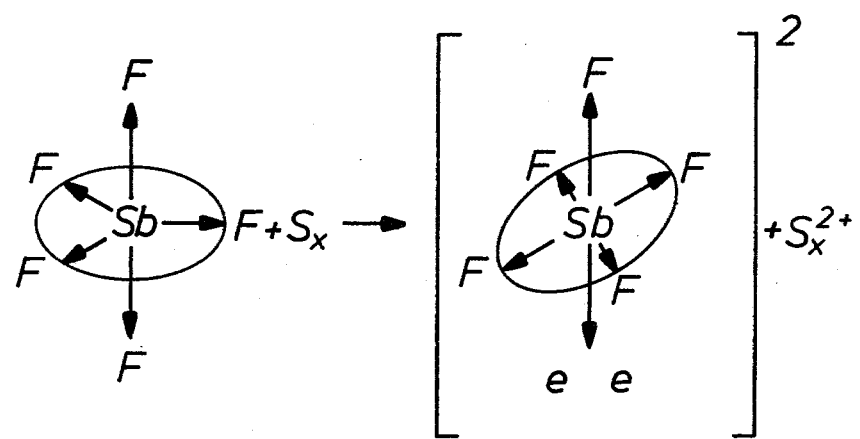

ELECTROCHEMICAL STORAGE CELL OR BATTERY OF THE ALKALI METAL AND SULFUR TYPE

BACKGROUND OF THE INVENTION

1. Field of the Invention

This invention relates to an electrochemical storage cell or battery with at least one anode chamber filled with a molten alkali metal as the anolyte and at least one cathode chamber filled with a sulfur-containing catholyte substance, with the chambers separated from each other by an alkali-ion-conducting solid electrolyte.

2. Description of the Prior Art

An electrochemical storage cell or battery based on alkali metal and sulfur having at least one anode chamber and one cathode chamber separated from each other by an ion-conducting solid electrolyte, and a felt fabric of graphite or carbon contained in the cathode chamber in addition to the sulfur is known in the art as shown by German Published Prosecuted Application No. 1 671 760.

An important disadvantage of such cells is, however, that they can be only partially recharged with large currents. In an Na/S cell, for instance, this disadvantage is related to the fact that sulfur (with small percentages of dissolved $Na_2S_5$) and $Na_2S_5$ (with percentages of dissolved sulfur) form two immiscible liquids at the operating temperature of such a cell, which is between 300° and 350° C. For, if a discharged Na/S cell which contains $Na_2S_3$ in the cathode chamber, is recharged, then sulfides richer in sulfur are formed first until $Na_2S_5$ has been produced in the entire cathode chamber or at least locally. Upon further charging, liquid sulfur is then produced at the points with a high electrochemical reaction rate. The sulfur being an insulator, blocks the electrochemical processes at these points.

In storage cells with high current densities, such as are presently planned for covering peak loads in electrical networks, particularly in connection with nuclear reactors, recharging as rapidly and completely as possible is especially important.

SUMMARY OF THE INVENTION

An object of the present invention is to provide an electrochemical storage cell or battery with at least one anode chamber filled with a molten alkali metal as the anolyte and at least one cathode chamber filled with a sulfur-containing catholyte substance with the anode chamber and the cathode chamber separated from each other by an alkali-ion-conducting solid electrolyte and an addition of a chemical compound of the polar bond type in the cathode chamber, which can charge the sulfur positively, while absorbing electrons.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing, in which antimony pentafluoride $SbF_5$ is shown before and after absorbing electron from sulfur.

DETAILED DESCRIPTION OF THE INVENTION

In a cell or battery of the type mentioned at the outset, the addition of a chemical compound of the polar bond type in the cathode chamber causes charge of the sulfur positively, at least partially while absorbing electrons.

Preferred additives are halogenide and pseudohalogenide compounds which increase the number of available ligands by absorbing electrons, mostly by absorbing pairs of electrons, in contact with the sulfur. The sulfur is charged partially positively as a result of removal of electrons.

Neglecting some secondary effects, the main condition for this process to take place is a gain of an amount of energy on the part of the polar chemical compound, which is greater than the ionization energy of sulfur.

Viewed from a chemical-structure point of view, compounds primarily of interest in the context of the invention, are those in which the anions occupy originally, i.e., before the sulfur is ionized, the corners of a tetrahedron or a double pyramid. Numerous compounds have been found to be suitable in which the cations consist of the group antimony, bismuth, arsenic or nickel and/or the anions of which consist of the group fluorine, chlorine, cyanide and rhodanide. The results obtained with antimony pentafluoride $SbF_5$ and tantalum fluoride $TaF_5$ were particularly good.

Examples of other useful compounds are antimony pentachloride, bismuth pentafluoride and bismuth pentachloride.

For the selection of suitable compounds according to the invention, the following criteria can be mentioned. Of course, the compound should have sufficient chemical and thermal stability at the operating temperature of the cell, without material increase in the corrosiveness of the mixture.

The main criterion for the selection of suitable substances, however, is their ability to ionize the sulfur present in the cathode chamber under the conditions prevailing there. This can be achieved particularly by compounds with a polar structure of the type $XY_4$ or $XY_5$, wherein X is central cation, preferably a metal, and Y is a ligand, preferably a halogen, which can relocate into a structure of higher packing density, absorbing electrons, particularly one or more pairs of electrons as quasiligands, while gaining energy.

The above-mentioned will be explained in greater detail by the example of the compound antimony pentafluoride $SbF_5$. There, 5 fluoride anions are arranged at the corners of a double pyramid (see figure, left side).

The high stability of the $SbF_5$ compound is brought about by strong Coulomb forces between the $Sb^{5+}$-cation and the 5 fluoride anions. By adding NaF, the number of ligands of the $Sb^{5+}$ can be increased from five to six. A change takes place here also with respect to the spatial arrangement of the ligands. The 6 ligands of the $SbF_6^{1-}$ now occupy the corners of an octahedron. The change in the constellation, observed when the number of ligands is changed, from the double pyramid to the octahedron is accompanied by an energy gain $\Delta E$. The magnitude of the latter is determined mainly by the Coulomb interaction between the additional sixth ligand and the positive nuclear charge number of the cation on the one hand, and the Coulomb interaction between the additional sixth ligand and the 4 closest adjoining ligands, on the other hand. If no sixth fluoride anion is offered to the molecule SbF$_5$, for instance, in the form of NaF, then a change in the spatial arrangement of the ligands can nevertheless come about under certain circumstances, namely, if the surrounding chemical milieu offers electrons and the ionization energies for the first and second electron to be accepted ($I_1$, $I_2$) fulfill the condition $$2I_1 + I_2 \leq \Delta E$$

i.e., are smaller than the energy gain through ligand restructuring.

In the case of the SbF$_5$ molecule, it has already been demonstrated that a pair of electrons given off by the surrounding chemical milieu can take on the role of the sixth ligand, in analogy to a sixth fluoride anion (A. Julg, Chimie Quantique, 2ième édition, published by Dunod Université, Paris, page 89, 1967). However, no suggestion is made there to exploit this effect technically.

By means of extensive calculations, the energy values $\Delta E$ were also calculated for the substances AsF$_5$ and BiF$_5$, which are analogous to SbF$_5$. The results are listed in Table 1.

TABLE 1

Stabilization Energy $\Delta E$ in Restructuring the Ligands from the Double Pyramid to the Octahedron as a Function of the Central Cation

| Substance | $\Delta E$ (eV) |
|---|---|
| AsF$_5$ | 119 |
| SbF$_5$ | 85 |
| BiF$_5$ | 76 |

In computing the energy values, only the Coulomb energies were taken into account, as the exchange energies furnish the smaller contribution to the bond because of the ionic structure (electron negativity of F=4 and Sb=1.9).

According to Pauling's relation $$\text{Ion character} = 1 - e^{-1/4(X_{cation} - X_F)^2},$$

the ion character in percent was calculated for the above-mentioned substances for the bond between the central cation and the fluoride anion. The results are listed in Table 2.

TABLE 2

Ion Character in Percent of the Complex Molecules Contained in Table 1

| Substance | Ion Character, percent |
|---|---|
| AsF$_5$ | 64 |
| SbF$_5$ | 67 |
| BiF$_5$ | 67 |

What was explained here for compounds of type XY$_5$ applies in principle also for substances with four ligands which are arranged at the corners of a tetrahedron and, having received a pair of electrons from the chemical environment, giving off energy, are now surrounded by five ligands.

A restructuring of the ligands from a tetrahedron to a double pyramid can then be observed. Compounds such as Ni(CN)$_4$ and Co(CO)$_4$ are examples.

Under the same criteria, compounds of the XY$_6$ and XY$_7$ types are also of interest.

It should be repeated once more that the main criterion in the selection of suitable chemical compounds is the ability to remove electrons from the surrounding sulfur at the prevailing temperatures and to thereby charge part of the sulfur chains or rings positively. It is achieved by this positive charging that the sulfur molecules, which otherwise act as an insulator and inhibit the chemical processes taking place at the cathode, travel away from the electrode which is charged positively during the charging process, due to electro migration.

In the following, the invention will be explained in further detail with the aid of an example.

EXAMPLE

An Na/S cell of the following design was used: An $\alpha$-Al$_2$O$_3$ tube is glass-fused to a $\beta$-Al$_2$O$_3$ tube which is 5 cm long and is closed at the bottom, which serves as a separator for the reactants sodium and sulfur and which has very high conductivity for Na$^+$ ions at 300° C. The first tube has an outside diameter of 11 mm and an inside diameter of 9 mm. The fused junction is protected against corrosion by the melt and its additives through the application of $\alpha$-Al$_2$O$_3$ by means of a plasma spray. There is liquid Na in the interior of the tube of $\beta$-Al$_2$O$_3$. At the upper end of the glass-fused $\alpha$-Al$_2$O$_3$ tube is located the remainder of the Na reservoir, which consists of alloy steel. The Na$^+$ ion-conducting $\beta$-Al$_2$O$_3$ tube, which serves as the solid electrolyte, is immersed in a steel cup which serves as the cathodic current collector. The about 3-mm wide gap between the electrolyte tube and the steel wall forms the cathode chamber, in which, besides sulfur of polysulfides and possible additions, a graphite felt (fiber diameter 20 μm, porosity about 95%) may further be present.

As a rule, the cell was charged with 60 mA/cm$^2$ (referred to the electrolyte surface). Sodium was filled as the anolyte into the interior of the $\beta$-Al$_2$O$_3$ tube, which serves as the anode chamber, and sulfur as catholyte into the space between the tube and the steel cup. The tests were carried out at 300° C.

The results obtained with respect to the improvement of the rechargeability, using antimony pentafluoride as a typical addition, are shown in the following Table.

TABLE

| Addition of SbF$_5$ in mol % | 0 | 0.1 | 0.4 |
|---|---|---|---|
| C/Co | 42 | 71 | 79 |

The quantity C/Co is understood to mean the relative capacity, i.e., the ratio of the measured capacity (C) to the theoretical capacity (Co). The theoretical capacity is that capacity which is obtained if the overall stoichiometry in the cathode chamber is changed during the discharge from pure sulfur all the way to Na$_2$S$_3$.

The significant improvement which can be achieved with the additives according to the invention can be seen from the Table values. While operation of the test cell without additions allows a rechargeability of only 42%, the capacity of the cell can be increased in the most favorable case to almost twice the value by additions according to the invention. This increase is of decisive importance for the economical employment of such cells as power cells.

There are claimed:

1. In an electrochemical storage cell or battery with at least one anode chamber containing alkali metal as the anolyte and at least one cathode chamber containing a sulfur-containing catholyte substance, with the anode chamber and the cathode chamber separated from each other by an ion-conducting solid electrolyte, the improvement which comprises the addition in the cathode chamber of $TaF_5$.

* * * * *